United States Patent
Roth et al.

(10) Patent No.: US 9,928,606 B2
(45) Date of Patent: Mar. 27, 2018

(54) METHOD FOR DETECTING INTERFERENCES IN A CROP COLLECTION SYSTEM

(71) Applicant: CLAAS SELBSTFAHRENDE ERNTEMASCHINEN GMBH, Harsewinkel (DE)

(72) Inventors: Michaela Roth, Bielefeld (DE); Andreas Nienhaus, Muenster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/278,286

(22) Filed: Sep. 28, 2016

(65) Prior Publication Data

US 2017/0091954 A1     Mar. 30, 2017

(30) Foreign Application Priority Data

Sep. 30, 2015  (DE) .................. 10 2015 116 572

(51) Int. Cl.
    *G06T 7/20*     (2017.01)
    *A01D 41/127*   (2006.01)
    *G06K 9/46*     (2006.01)

(52) U.S. Cl.
    CPC ........ *G06T 7/2033* (2013.01); *A01D 41/1271* (2013.01); *G06K 9/46* (2013.01); *G06K 2209/17* (2013.01)

(58) Field of Classification Search
    CPC .... G06T 7/2033; G06K 9/46; G06K 2209/17; A01D 41/1271
    See application file for complete search history.

(56) References Cited

U.S. PATENT DOCUMENTS

| | | | | |
|---|---|---|---|---|
| 2013/0335574 | A1* | 12/2013 | Ishida | H05B 37/0227 348/159 |
| 2015/0016681 | A1* | 1/2015 | Fukata | G08G 1/165 382/103 |
| 2016/0012278 | A1* | 1/2016 | Banhazi | A01K 29/00 382/110 |
| 2016/0040979 | A1* | 2/2016 | Takiguchi | G01S 17/42 356/614 |
| 2016/0092719 | A1* | 3/2016 | Xue | G06K 9/4652 382/103 |
| 2016/0213226 | A1* | 7/2016 | Yanagidate | A61B 1/00009 |

FOREIGN PATENT DOCUMENTS

DE     10 2008 032 191     1/2010

OTHER PUBLICATIONS

Machine translation for DE 10 2008 032 191 A1, IDS, Behnke et al., 2008.*

* cited by examiner

*Primary Examiner* — Qian Yang
(74) *Attorney, Agent, or Firm* — Collard & Roe, P.C.

(57) ABSTRACT

A method for detecting interferences in a crop collecting system of an agricultural harvesting machine includes optically detecting a crop stream at the crop collection system. The method includes that the movement of an object over time in the crop stream is determined in the optically detected crop stream and, based on the determined movement of the object, an interference of the crop collection system is detected.

27 Claims, 3 Drawing Sheets

METHOD FOR DETECTING INTERFERENCES IN A CROP COLLECTION SYSTEM

CROSS-REFERENCE TO A RELATED APPLICATION

The invention described and claimed hereinbelow is also described in German Patent Application DE 10 2015 116 572.4, filed on Sep. 30, 2015. The German Patent Application, the subject matter of which is incorporated herein by reference, provides the basis for a claim of priority of invention under 35 U.S.C. 119(a)-(d).

BACKGROUND OF THE INVENTION

The invention relates to a method for detecting interferences in a crop collection system of an agricultural harvesting machine, in which a crop stream is optically detected at the crop detection system.

Agricultural harvesting machines from the prior art, such as, for example, combine harvesters, comprise crop collection systems with which crop is intended to be picked up and fed to the further processing. Such crop collection systems regularly comprise a plurality of individual devices which can be operated using different parameters. In this way, the cutting height, position and speed of the reel as well as the movement of the cross auger and of the feeder, for example, of crop collection systems of combine harvesters can be adjusted. The ground speed of the harvesting machine also determines the quantity of crop that is picked up by the crop collection system.

Depending on the setting of the crop collection system and on the type, quantity, and properties of the picked-up crop, different types of interferences in the operation of the crop collection system can occur. One known example thereof is the occurrence of a crop blockage in the header of a combine harvester. If a crop blockage becomes fully formed, the harvesting process must be halted and a great deal of effort must be applied in order to eliminate the crop blockage. The time required therefor adversely affects the economic efficiency of the operation of the combine harvester.

More likely than not, such a crop blockage (or other interferences of crop collection systems) does or do not occur suddenly. Instead, the crop blockage or interferences build up over a relatively long period of time until a complete blockage occurs, which necessitates that the operation be completely interrupted. One problem associated therewith is that, by the time the complete blockage is readily and clearly detectable, it is already too late to correct the operation of the crop collection system, which also would have necessitated an interruption. Efforts are made to detect such a developing crop blockage or any other interference at an early point in time, so that suitable reactionary measures can be carried out. Such a reactionary measure might include temporarily reducing the present crop throughput, in order to avoid the developing crop blockage without necessitating the interruption of the harvesting operation.

DE 10 2008 032 191 A1 describes a self-propelled harvesting machine comprising a sensor unit for monitoring the crop stream within a front crop collection attachment of the harvesting machine. In particular, a camera is provided, which generates images of the crop stream. These images are subjected to an image-comparison process, in which the generated images of the crop stream are compared with reference images. By use of such a macroscopic comparison of the present image with the reference image, it can be ascertained whether the present crop stream deviates from the acceptable crop stream according to the reference image. In this case, one takes advantage of the situation that differences will become apparent in the present image, even as viewed macroscopically, when there is an increased amount of crop, for example, with regard to the portion and distribution of light versus dark ranges of brightness in the two images, etc.

A disadvantage of this approach is that it is based only on the simple presence of a difference between the reference image and the present image at the macroscopic level. This is too unspecific, on the one hand, since such a difference can occur in different interference scenarios, all of which can be detected, in theory, via the presence of a detectable difference, but which require a different and, optionally, opposing correction behavior in each case in order to be avoided or eliminated. In this regard, it is possible that the implemented reaction to the detected difference does not solve the problem, but rather worsens it.

Another disadvantage of the approach according to the prior art is that there are also interferences that cannot be detected, or cannot be detected early enough, on a basis of such a macroscopic image comparison.

Proceeding from this background, the problem addressed by the present invention is that of refining and improving the method known from the prior art for detecting interferences in a crop collection system with regard to accuracy, reliability, and timeliness.

SUMMARY OF THE INVENTION

The present invention overcomes the shortcomings of known arts, such as those mentioned above.

The present invention provides a method for detecting interferences in a crop collection system, wherein a crop stream at the crop collection system of an agricultural harvesting machine is optically detected, and wherein movement of an object over time in the crop stream is determined and, based on the determined movement of the object, an interference of the crop collection system is detected.

The inventive operation finds that the information regarding the movement of individual objects in the crop stream is a reliable indicator of an early detection of interferences in the crop collection system. Instead of a macroscopic comparison of images overall, an inspection is carried out at the microscopic level, as it were, specifically of a part of section of the image that is small relative to the captured image region overall. This aforementioned finding, in turn, is based on the fact that, at first glance, the movement of different objects in the crop stream depends more on the macroscopic properties of the crop stream and, optionally, on the position within the crop stream than on whether the corresponding object belongs to the grain or is only another type of component of the crop. Therefore, it depends less on identifying a certain type of object in the crop and more on simply detecting an object in the crop that is optically so prominent that its movement in the crop stream can be tracked. With respect to the further components of the crop stream located in the surroundings of this object, it can then be deduced that their movement is highly correlated with the movements of the detected object.

In an embodiment, the inventive method differentiates the movement of the object with regard to the absolute speed and the direction. The inventive method preferably allows a particular change in these variables to be incorporated into the evaluation. In another embodiment, the inventive method uses an optical identifying feature of the object for determining the movement of the object in the crop stream. Preferably, the determination of the object takes place logically downstream from the locating of the optical identifying feature. In this case, an investigation, of this kind, of the entire crop stream or parts thereof can take place.

For the purpose of determining the movement of the object, the invention relies upon a determination of the displacement of a single image point of the object or of the identifying feature, which determination is particularly efficient with regard to the required computing power. For inspecting a plurality of objects in the crop stream, both the frequency with which the prominent identifying features occur and their particular determined movement can be taken into account and related to one another. The invention also determines an optical flow for a part of the detected crop stream or for the detected crop stream overall. Preferably, the invention includes a camera system for detecting the crop stream.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
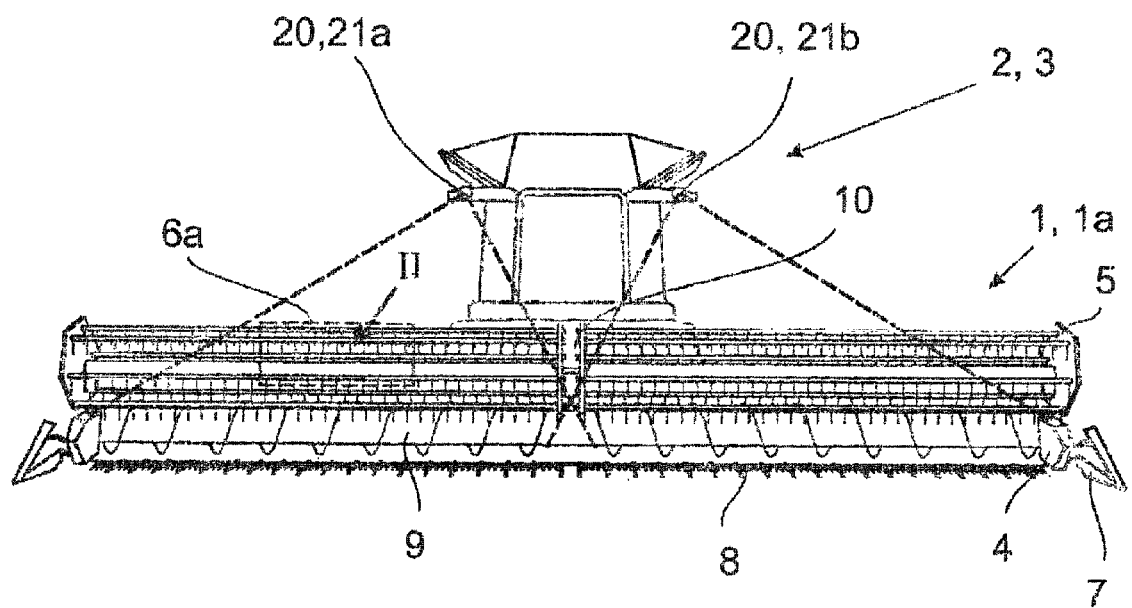
FIG. 1 shows a schematic front view of a crop collection system of a combine harvester for carrying out the method according to the invention.

The inventive method is used for detecting interferences in a crop collection system 1, shown in a schematic front view in FIG. 1. The crop collection system 1 belongs to an agricultural harvesting machine 2, which is a combine harvester 3 in the exemplary embodiment represented. In particular, the crop collection system 1, which is a header 18 in this case, comprises a housing 4, a reel 5, which is adjustably mounted on support arms and assists in feeding the crop stream 6 into the header 1a. A crop divider 7 is disposed at each of the outer front edges of the header 1a, which separates the individual stalks from one another within the crop stream 6 so that a crop lane results. The header 1a further comprises a knife bar 8, which is equipped with oscillating knife blades, and a cross auger 9, which guides the crop together toward the middle of the header 1a and transfers said crop to a feeder 10, wherein the feeder 10 itself is no longer a part of the header 1a in the narrower sense.

The crop stream 6 is optically detected at a crop collection system 1 of the agricultural harvesting machine 2. This crop stream 6 does not need to be the entire crop stream 6 processed by the crop collection system 1. Instead, the processed crop stream is regularly and preferably a part of the entire crop stream 6 processed by the crop collection system 1 and, specifically, the part of the crop stream 6 that is moved through a detection region 6a. In the inventive method, movement of an object 11a, b over time in the crop stream 6 is determined in the optically detected crop stream 6 and, based on the determined movement of the object 11a, b, an interference of the crop collection system 1 is detected.

Figure 2A:
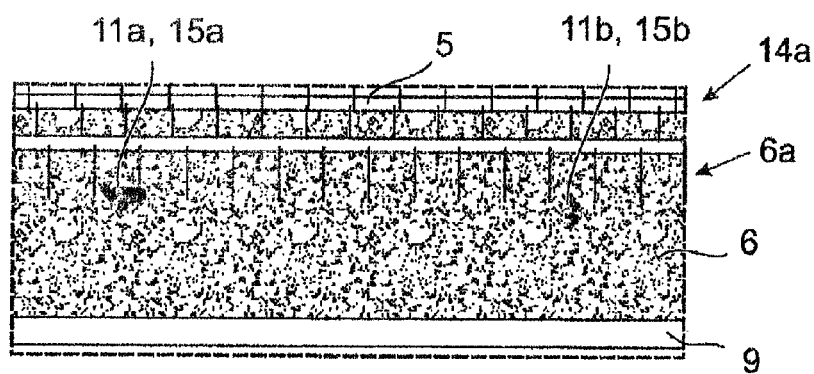
FIG. 2a shows a first of three time-shifted photographs of the crop stream at the crop collection system from FIG. 1, captured during the implementation of the method according to the invention.
Figure 2B:
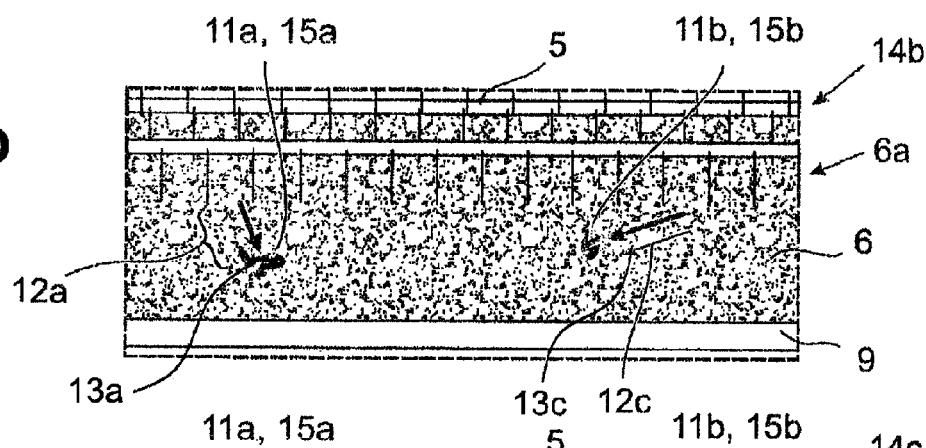
FIG. 2b shows a second of the three time-shifted photographs of the crop stream at the crop collection system from FIG. 1, captured during the implementation of the method according to the invention.
Figure 2C:
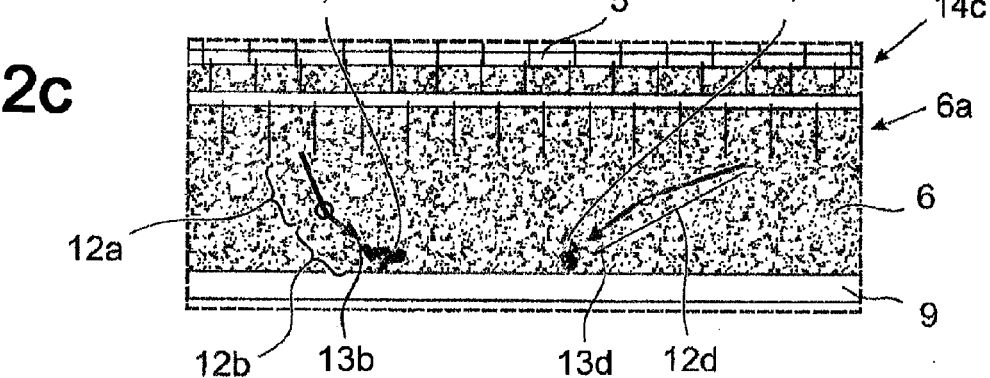
FIG. 2c shows a third of three time-shifted photographs of the crop stream at the crop collection system from FIG. 1, captured during the implementation of the method according to the invention.

FIG. 2a-c each show, in this context, a detection of the crop stream 6, by way of example, at the detection region 6a of the crop collection system 1 indicated in FIG. 1. The movement of two such objects 11a, b is shown in FIG. 2a-c, by way of example.

Determination of the movement of the object 11a, b preferably comprises a determination of a speed of the object 11a, b. Doing so may include determining an absolute speed 12a-d of the movement of the object 11a, b.

In FIGS. 2b and 2c, such an absolute speed is indicated as a difference in position of the particular object 11a, b relative to the particular previous photograph. Alternatively or additionally, the determination of the movement of the object 11a, b can include a determination of a direction of movement 13a-d of the movement of the object 11a, b, which is also indicated in FIGS. 2b and 2c, by way of example.

Determining the movement of the object 11a, b includes a determination of a change in the speed of the object 11a, b over time. Such a determination can include determining a change in the absolute speed 12a-d over time and, alternatively or additionally, a determining a change in the direction of movement 13a-d over time. As shown in FIGS. 2b and 2c, these two variables change for both objects 11a, b in the exemplary embodiment represented.

In this case, a plurality of photographs 14a-c of the crop stream 6 is generated temporally one after the other in order to determine the movement of the object 11a, b. In particular, FIG. 2a shows a first such photograph 14a, FIG. 2b shows a second such photograph 14b, and FIG. 2c shows a third such photograph 14c.

According to an embodiment, an optical identifying feature 15a, b of the object 11a, b is determined in order to determine the movement of the object 11a, b. Such an optical identifying feature 15a, b can be any type of preferably optically prominent substructure of the object 11a, b. In this case, it is preferably provided that, the optical identifying feature 15a has an expansion, in a front view, of 1.5 cm by 1.5 cm. The optical identifying feature 15a also can be the entire object 11a, b, as is the case here (as shown). Preferably, a particular position of the identifying feature 15a, b is detected in the plurality of photographs 14a-c. This position is not indicated separately in FIG. 2a-c, for the sake of clarity. It is apparent, however, in each of the indicated absolute speeds 12a-d and the direction of movements 13a-d of the objects 11a, b.

Preferably, the object 11a, b in the crop stream 6 is established on a basis of a located optical identifying feature 15a, b. According to this preferred variant, therefore, an object 11a, b is not determined first and then a corresponding identifying feature 15a, b. Instead, such an optical identifying feature 15a, b is first detected or recognized in the detected crop stream 6 and then the object 11a, b is marked as the component of the crop stream 6 that belongs to the optical identifying feature 15a, b. In such a case, the entire object 11a, b as such neither needs to be completely known nor optically detected. It suffices that the optical detection relates only to the identifying feature 15a, b and the rest of the object 11a, b in this sense remains "invisible". Since the object 11a, b necessarily moves with the identifying feature 15a, b, however, this does not limit the determination of the movement of the object 11a, b.

In this case, it is preferable that, in order to establish the object 11a, b, the detected crop stream 6 is investigated substantially entirely, in particular, on a basis of a criterion for locating optical identifying features. Therefore, the entire detected crop stream 6 can be investigated for optical identifying features, wherein the criterion can relate to a particularly high-contrast contour or an unusual manifestation of this contour. It is these two properties which make it easier to "track" and "recognize" the identifying feature 15a, b in the successive photographs 14a-c. Those components of the crop stream 6 are then selected as objects 11a, b that have a particular movement that is particularly easy to determine on a basis of its identifying features 15a, b.

According to another embodiment, the determination of the movement of the object 11a, b is based on a distance determination of the particular position determined in the plurality of photographs 14a-c. This correlation has already been presented above in the description and representation of the absolute speed 12-d and the direction of movement 13a-d. On a basis of the rate at which the photographs 14a-c are created, i.e., the refresh rate, and based on the geometry and the dimensions of the region in which the crop stream 6 is detected, i.e., the detection region 6a, and depending on the corresponding device for detecting the crop stream 6, a corresponding movement or an absolute value 12a-d is assigned to a distance between particular positions of the identifying feature 15a, b in the photographs 14a-c.

Preferably, in order to determine the distance, a displacement of an image point, which also can be referred to as a pixel, assigned to the object 11a, b and, in particular, to the identifying feature 15a, b between the plurality of photographs 14a-c is determined in this case. Given that it is only the displacement of a single pixel of the identifying feature 15a, b that is calculated, the computing time for this calculation is substantially reduced overall as compared to the observation of the identifying feature 15a, b or even of the object 11a, b. The computing time saved as a result advantageously makes it possible to increase the refresh rate or the processing of photographs 14a-c with a higher resolution.

It is preferable that a plurality of objects 11a, b and, in particular, optical identifying features 15a, b, in the detected crop stream 6 is determined. Such a plurality of identifying features 15a, b can be determined on a basis of the aforementioned criterion for locating optical identifying features. In this case, it is conceivable that the interference also is detected on a basis of a number of the determined identifying features 15a, b. The point, therefore, is that a greater or a lesser number of such identifying features 15a, b is determined when such a criterion is applied, depending on the state of the crop stream 6. On the one hand, a greater number thereof can make it possible to determine the movement of a larger number of objects 11a, b, which offers a broader basis for detecting an interference of the crop collection system 1. On the other hand, the sheer fact that a greater or lesser number of identifying features 15a, b was determined also can form an independent factor in the detection of such an interference.

It also is possible that the interference is also detected on a basis of a change in the number of identifying features 15a, b determined over time.

Such a change over time also can come to play in the detection of an interference along a longer path. In fact, it is possible that a movement over time is determined for the plurality of identifying features 15a, b. This also can be expressed more precisely by stating that a movement over time is determined for the plurality of objects 11a, b, to which the plurality of identifying features 15a, b belong, respectively. In this case, the interference also is preferably detected on a basis of the particular movement determined for the plurality of identifying features 15a, b. It also is possible that the interference is detected on a basis of a variance of the particular movement determined for the plurality of identifying features 15a, b. In this case, the term "variance" is not to be interpreted in the narrower stochastic sense, but rather in the sense of a general difference. One criterion for detecting an interference in the crop collection system 1, therefore, can be how different the determined movements of the different identifying features 15a, b are from one another.

It also is preferable that the determination of the movement of the object 11a, b includes the at least partial determination of an optical flow of the detected crop stream 6. As should be understood by a person skilled in the art, such an optical flow is considered to be the vector field of the speed projected into the image plane, corresponding to a displacement from photograph to photograph in this case, of the visible points of the object space. Such an optical flow therefore describes the movement of an entire plurality of objects, preferably even objects substantially visible by all, in the detected crop stream 6.

In another embodiment, the inventive method includes determining a speed property of the crop stream 6, on a basis of the determined movement of the object 11a, b. This speed property can be, for example, an average speed 16 of the crop stream 6, wherein this average speed of the crop stream is not intended to be an average over time, but rather an average of the speed of different parts of the crop stream 6, e.g., of different objects 11a, b, at the same time.

Figure 3:
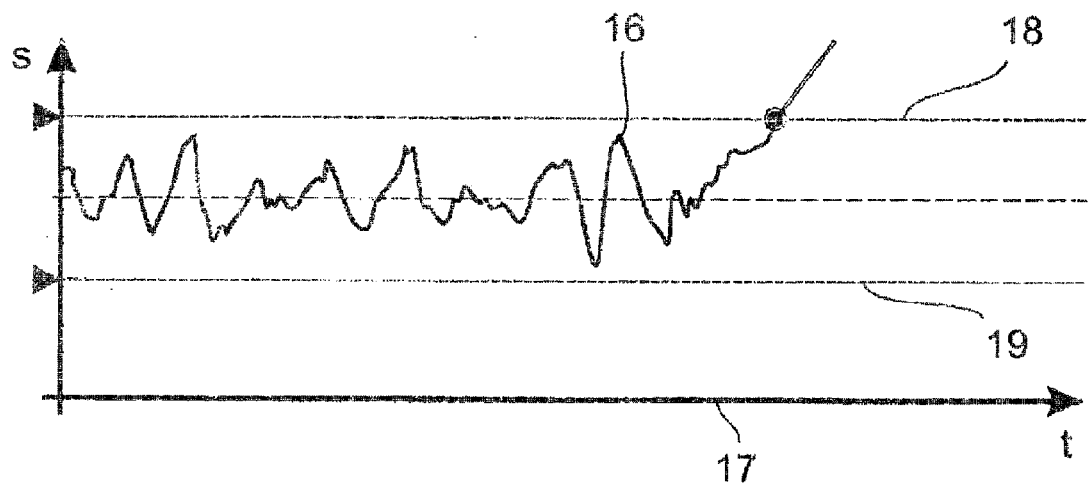
FIG. 3 shows a graph of an average speed of the crop stream at the crop collection system from FIG. 1, determined during the implementation of the method according to the invention.

Such an average speed 16 over a course of time 17 is represented in FIG. 3 together with an upper limit value 18 and a lower limit value 19. In this case, it is preferable that a crop blockage is detected as an interference on a basis of the determined speed property of the crop stream 6. In the scenario from FIG. 3, a crop blockage is therefore detected as an interference in the instant in which the average speed 16 exceeds the upper limit value 18.

Another embodiment is characterized in that a reduction of a throughput of the harvesting machine 2 is triggered when a crop blockage is detected. In this manner, the developing complete crop blockage can be eliminated before permanent blockage results in the crop collection system 1. It also is possible that an interference, albeit a different one, is detected when the lower limit value 19 is fallen below, which then prompts an increase in the throughput of the harvesting machine 2, for example. Such an interference can be a development of a so-called bunch. This is regularly associated with a large number of determined identifying features 15a, b and with the fact that the particular movement determined for the plurality of identifying features 15a, b has a low variance.

A flow of crop that is low or too low can be detected as an interference by way of a low number of identifying features 15a, b being detected. In this case, the particular movement determined for these identifying features 15a, b regularly also has a low variance.

To implement the method according to the invention, it is preferable that a crop camera system 20 is disposed on the harvesting machine 2 for the purpose of detecting the crop flow 6, as represented in FIG. 1, by way of example. For that matter, FIG. 1 represents a preferred embodiment, according to which the crop camera system 6 for detection is disposed in the region between a cutting system, the knife bar 8 in this case, and a cross conveyor system, the cross auger 9 in the present example of the crop collection system 1. This detection range has the potential to yield the most information with regard to interferences which can potentially occur in the crop collection system 1. In theory, the crop camera system 20 can consist of a single camera, wherein the camera must then detect a relatively large angle of vision. It is therefore preferable, as also is represented in FIG. 1, that the crop camera system 20 comprises a plurality of camera devices 21a, b for the substantially non-overlapping detection of the crop stream 6. In this manner, both the distortion in the detection of the crop stream 6 and the requirements, in particular, on the resolution of the camera devices 21a, b are reduced.

In another embodiment, the crop camera system 20 is designed for the monochromatic detection of the crop stream 6. In other words, the crop camera system 20 does not differentiate between different colors. Instead, the crop camera system 20 merely detects differences in brightness for each image point. In this respect, only one brightness value having any depth, in principle, is assigned to each image point. One advantage thereof is that it is essentially only the differences in brightness that are relevant for the analysis that is relevant here, and so the color information can be easily dispensed with; as a result, the amount of data relative to the resolution is reduced. Moreover, greater resolutions can be achieved as compared with a color image.

Furthermore, it is preferable that the crop camera system 20 is designed for monochromatic detection in the infrared range. In this case, the wavelength range starting at 800 nm is considered to be the infrared range. In particular, the crop camera system 20 is designed for detection in the range between 800 nm and 900 nm and, more particularly, in the range between 825 nm and 875 nm. Such a range delimitation can also be achieved by a band-pass filter in the crop camera system 20.

It also is preferable that an illumination by an LED light source takes place for illumination in the infrared range or in the wavelength range intended for the detection. This illumination advantageously takes place from the direction of the crop camera system 20. The illumination preferably takes place spatially uniformly over the illumination region or over the detection region 6a and can be adapted, preferably dynamically, on a basis of an ambient light intensity.

Finally, it is preferred that the crop camera system 20 has a refresh rate between 20 and 40 images per second. The crop camera system 20 also can have a refresh rate between 25 and 35 images per second. It has been shown that, relative to the expected speed range of the crop stream and the dimensions of the crop collection system 1, at this refresh rate, a displacement between two photographs is expected in a moderate range of image points, e.g., between 25 and 15 image points, which is particularly favorable for the specific processing in this case.

LIST OF REFERENCE NUMBERS 1 crop collection system
1a header
2 harvesting machine
3 combine harvester
4 housing
5 reel
6 crop stream
6a detection region
7 crop divider
8 knife bar
9 cross auger
10 feeder
11a, b objects
12a-d absolute speed
13a-d direction of movement
14a-c photographs
15a, b identifying features
16 average speed
17 graph with respect to time
18 upper limit value
19 lower limit value
20 crop camera system
21a, b camera devices As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for detecting interferences in a crop collection system of an agricultural harvesting machine, comprising the steps of:
   optically detecting a crop stream at the crop collection system with a crop camera;
   determining a movement of an object over time in the optically detected crop stream;
   determining a speed property of the crop stream on a basis of the determined movement of the object;
   detecting an interference of the crop collection system in the form of a crop blockage, based on the determined speed property; and
   initiating a reduction of a throughput of the harvesting machine when a crop blockage is detected.

2. The method according to claim 1, wherein the step of determining the movement of the object includes determining a speed of the object, determining a direction of movement of the object or both.

3. The method according to claim 2, wherein the determining of the direction of movement of the object requires determining an absolute speed of the movement of the object.

4. The method as recited in claim 2, wherein the step of determining the movement of the object includes determining a change in a speed of the object over time, determining a change in a direction of the movement over time or both.

5. The method according to claim 4, wherein the determining the change in the speed of the object over time includes determining a change in an absolute speed over time.

6. The method according to claim 4, wherein the step of determining a movement of the object over time includes generating a plurality of photographs of the crop stream temporally one after.

7. The method according to claim 6, wherein the step of determining a movement of the object over time includes determining an optical identifying feature of the object.

8. The method according to claim 7, wherein determining the optical identifying feature of the object includes determining a particular position of an identifying feature in the plurality of photographs.

9. The method according to claim 8, wherein the object in the crop stream is established on a basis of the located optical identifying feature.

10. The method according to claim 9, further comprising investigating the detected crop stream substantially entirely in order to establish the object on a basis of a criterion for locating the optical identifying feature.

11. The method according to claim 10, wherein the step of determining a movement of an object is based on a distance determination of the particular determined position in the plurality of photographs.

12. The method according to claim 11, wherein a displacement of an image point assigned to the object between the plurality of photographs is determined to determine the distance.

13. The method according to claim 12, wherein the particular determined position in the plurality of photographs is a displacement of an image point assigned to the object.

14. The method according to claim 13, wherein a plurality of objects in the detected crop stream is determined on a basis of a criterion for locating optical identifying features.

15. The method according to claim 14, wherein the plurality of objects comprises a plurality of optical identifying features.

16. The method according to claim 14, wherein an interference is detected on a basis of a number of the determined identifying features.

17. The method as recited in claim 16, wherein the interference also is detected on a basis of a change in a number of identifying features determined over time.

18. The method as recited in claim 17, wherein for the plurality of identifying features, a particular movement over time is determined.

19. The method as recited in claim 17, wherein for the plurality of identifying features, the interference also is detected on a basis of the particular movement determined for the plurality of identifying features, on a basis of a variance of the particular movement determined for the plurality of identifying features or both.

20. The method as recited in claim 18, wherein the determination of the movement of the object includes the at least partial determination of an optical flow of the detected crop stream.

21. The method according to claim 1, wherein the speed property is an average speed of the crop stream.

22. The method according to claim 1, wherein the crop camera system is disposed in a region between a cutting system and a cross conveyor system of the crop collection system.

23. The method according to claim 1, wherein the crop camera system comprises a plurality of camera devices for the substantially non-overlapping detection of the crop stream.

24. The method as recited in claim 23, wherein the crop camera system is designed for monochromatic detection of the crop stream.

25. The method as recited in claim 24, wherein the crop camera system is designed for monochromatic detection in the infrared range.

26. The method as recited in claim 23, wherein the crop camera system has a refresh rate of between 20 and 40 images per second.

27. The method as recited in claim 23, wherein the crop camera system has a refresh rate of between 25 and 35 images per second.

\* \* \* \* \*